United States Patent [19]

Pasternack

[11] 4,246,864

[45] Jan. 27, 1981

[54] DEVICE FOR INDICATING AIRTIGHTNESS

[75] Inventor: Adalbert Pasternack, Bad Schwartau, Fed. Rep. of Germany

[73] Assignee: Drägerwerk Aktiengesellschaft, Fed. Rep. of Germany

[21] Appl. No.: 37,358

[22] Filed: May 9, 1979

[30] Foreign Application Priority Data

Jun. 2, 1978 [DE] Fed. Rep. of Germany ....... 2824175

[51] Int. Cl.[3] ......................... G01L 19/12; G08B 7/00

[52] U.S. Cl. ......................................... 116/4; 116/70; 116/266; 128/202.22

[58] Field of Search ......... 116/266, 276, 271, DIG. 7, 116/272, 70; 206/524.8; 128/28, 276

[56] References Cited

U.S. PATENT DOCUMENTS

| | | | |
|---|---|---|---|
| 3,330,249 | 7/1967 | Rodgers | 116/266 |
| 3,431,773 | 3/1969 | Calhoun | 73/49.3 |
| 3,699,914 | 10/1972 | Smith | 116/266 |
| 3,731,295 | 5/1973 | Van Luyn | 73/49.3 |
| 3,948,207 | 4/1976 | St. Paul | 116/4 |
| 4,105,095 | 8/1978 | Thrasker, Jr. | 116/276 |

FOREIGN PATENT DOCUMENTS

| | | | |
|---|---|---|---|
| 909299 | 3/1954 | Fed. Rep. of Germany | 116/266 |

*Primary Examiner*—Daniel M. Yasich
*Attorney, Agent, or Firm*—McGlew and Tuttle

[57] ABSTRACT

A device for indicating airtightness of a packing for apparatus which is to be stored under a vacuum and, particularly for protective breathing apparatus, comprises, a packing enclosing a packing space in which the apparatus is stored which has an outer surface with a recessed portion forming a chamber having a cover overlying the chamber enclosing and sealing it. A hollow expansible and retractable member, such as a bellows, is mounted in the chamber and has an opening to its interior extending through the packing into the interior of the packing space so that the pressure inside of the bellows is the same as the packing space. A ball is disposed between the bellows and the cover and it is held by expansion of the bellows against it in a fixed position which indicates an increase of the pressure within the packing beyond a predetermined amount. When the vacuum in the packing is sufficient, the pressure reduces and retracts the bellows so that the ball is freely movable in the space between the bellows and the cover.

4 Claims, 1 Drawing Figure

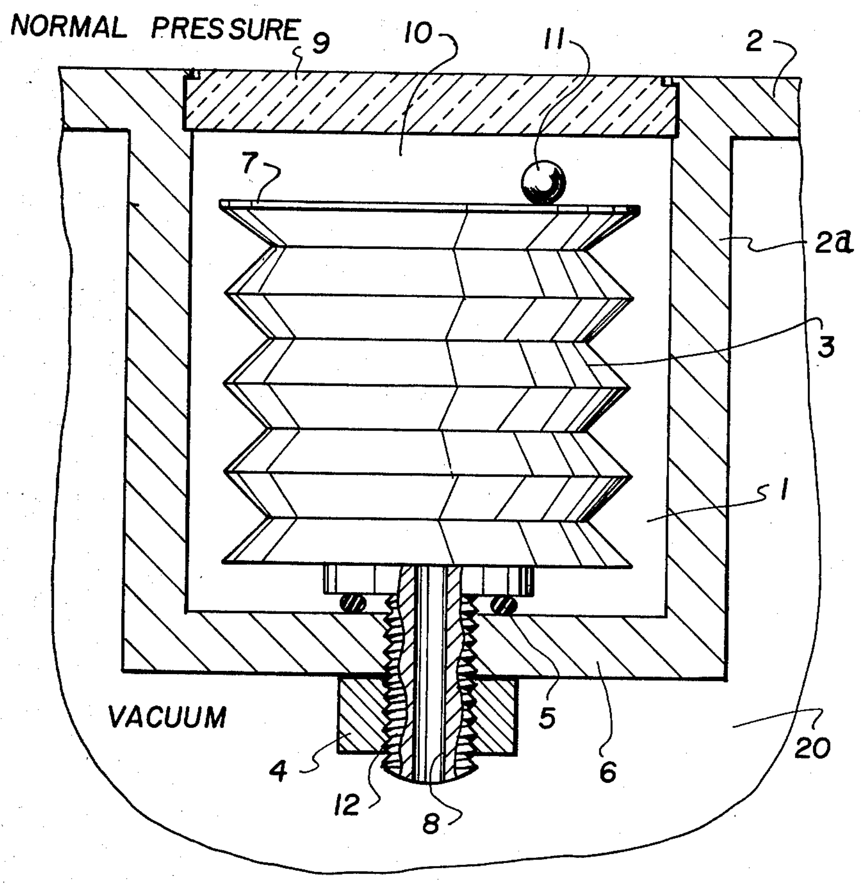
NORMAL PRESSURE
9
10
11
2
7
2a
3
1
VACUUM
5
20
4
6
12
8

DEVICE FOR INDICATING AIRTIGHTNESS

FIELD AND BACKGROUND OF THE INVENTION

This invention relates to packing devices in general and, in particular, to a new and useful device for indicating the airtightness of a container for apparatus which is to be stored under vacuum, and particularly, for protective breathing apparatus.

DESCRIPTION OF THE PRIOR ART

In the airtight or gastight packing of apparatus or materials which may alter under the influence of the atmosphere or substances present in the air, or which may absorb such substances, the packing or package must be checked for tightness. It is required that the packing or package not be opened or destroyed during the checking thereof for air- or gastightness.

In this respect, it is advantageous to pack the protective breathing apparatus in a vacuum container, with the container including a lower part which accommodates the breathing apparatus, and which also includes a cover. Both parts of the container are gastight and, with a sufficient vacuum, the closed container is held assembled by the atmospheric or normal pressure. Opening containers are an indication that they are leaking. After a container opens, the breathing apparatus to be protected is exposed to the atmosphere and is no longer protected against atmospheric influence or substances which are present in the ambient air. For this reason, it is essential that the absence of tightness be detected before the container opens.

A packing or container for objects to be stored under vacuum, particularly protective breathing apparatus, is known, in which at least a portion of the wall of the container accommodating the apparatus is formed by, or comprises, a diaphragm and a device indicating the deflection of the diaphragm. The diaphragm is biased by a spring acting against the outer atmospheric pressure, and is protected by a rigid cover which does not close the container gastightly. The position of the diaphragm is indicated to the outside by a pin which is secured to the diaphragm and extends through a bore in the cover. With a sufficient vacuum in the container, the diaphragm is pressed by the outer air pressure, against the action of the spring, into the interior of the container and the pin disappears in the bore of the cover. As soon as the vacuum drops, the force of the spring prevails over the outer atmospheric pressure so that the pin moves out of the bore and indicates a leak.

A disadvantage of this package is that, to actuate the warning device, a force acting from the outside on the diaphragm, namely, the outer atmospheric pressure, is needed. Contamination or water penetrating therein may considerably change the forces which act on the diaphragm. This partly invalidates the intended indication of the pressure in the container. In addition, due to the tolerances, it is sometimes difficult to determine whether the pin has moved sufficiently to indicate the untight condition of the container under vacuum (See German Pat. No. 909,299).

SUMMARY OF THE INVENTION

The present invention is directed to a device which indicates the tightness of the container for protective breathing apparatus stored under vacuum, the operation of which would be independent of a contamination of the ambience and the atmosphere and of a subjective judgment.

In accordance with the invention, there is provided a device for indicating the airtightness of a container for apparatus which is to be stored under vacuum and which is particularly applicable for storing protective breathing apparatus. The device includes a container in which the apparatus is to be stored which has an outer surface with a recessed portion forming a chamber which is covered by a cover so that it is sealed along with the interior of the package in which the packaging space is defined. A hollow expansible and retractable bellows is mounted in the chamber and has an opening through the container wall to the interior packing space so that the pressure inside the bellows is at the pressure of the packing space. When the pressure within the packing space increases beyond a predetermined amount, the bellows will expand to cause a ball positioned between the bellows and the cover of the chamber to be held fixed between the cover and the bellows so that it will not move. If, however, the pressure in the packing space remains at the desired vacuum, the bellows will move sufficiently to free the ball so that it moves easily in the chamber.

The particular advantage obtained with the present invention is that the indicating device has no direct connection to the ambient. This securely prevents contamination from affecting the function of the device. In the presence of a leak in the package, the bellows expands and its front wall holds a ball firmly against the wall of the chamber. Since the ball is no longer movable, the result of the checking is that no noise is perceptible. In addition, the mobility of the ball may be inspected through a provided window. In practice, the indication may be made sensitive to any degree, since any length of the bellows may be chosen. In any event, this simple and secure means makes it possible to detect the beginning of a leak, and thus, a spontaneous opening of the vacuum packing with possible damages to the packed breathing apparatus is securely prevented.

Accordingly, an object of the present invention is to provide a device for indicating the airtightness of a container for apparatus to be stored under vacuum, particularly for protective breathing apparatus, which comprises, a container wall enclosing a packing space in which the apparatus is stored which has an outer surface with a recessed portion forming a chamber and with a cover for the chamber to the outside which overlies the recessed portion, and further including a hollow expansible and retractable member mounted in the chamber and having an opening which extends through the wall into the interior of the packing space so that the pressure inside the hollow member is the same as the packing space and which also includes a ball disposed between the member and the cover and which is held by an increase in pressure in the packing space, when the member is expanded, beyond a predetermined amount against the cover so that the ball remains in a fixed position to indicate the increased pressure, said member being movable by a decrease in pressure beyond a predetermined amount to free the ball so that it is movable in the space between the member and the cover.

A further object of the invention is to provide a device for indicating airtightness in a container which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

In the Drawing:

The only FIGURE of the drawing is a partial sectional view of a container having an airtightness indicating device thereon, constructed in accordance with the present invention.

DESCRIPTION OF THE PREFERRED EMBODIMENT

Referring to the drawing in particular, the invention embodied therein, comprises, a device for indicating the airtightness of a packing package or container, generally designated 2, for apparatus which is to be stored under vacuum conditions, and particularly, breathing apparatus, which has not been shown. The package 2 includes a recessed portion 2*a* forming a chamber 1 in which a hollow expansible and retractable member 3, such as a bellows, is mounted. Bellows 3 has an opening to its interior which extends through the package and this opening is defined by a bolt 12 which, for example, may be threaded into the package and secured by a threaded nut 4. The interior of the bellows communicates through an orifice or a bore 8 to a package space 20 enclosed by the packing 2. Thus, the pressure at the interior of the bellows is the same as that of the packing space 20.

In accordance with the invention, the bellows is mounted by a screw connection made up of the threaded bolt 12 and a nut 4 on the bottom 6 of the chamber 1 in a position such that its top wall 7 is disposed opposite a cover wall 9 for the chamber 1. A ball 11 of a predetermined diameter is positioned on the top wall 7 of the bellows, and the sizing of the bellows is such that the ball 11 is confined in the intermediate space 10 between the top wall 7 and the cover 9. Cover 9 closes the chamber 1 relative to the outside.

When the packing space 20 is properly evacuated, the bellows 3 will remain retracted and the top wall 7 will be sufficiently spaced from cover 9 to permit the ball 11 to be moved freely around in the space.

Because the orifice bore 8 and the interior bellows 3 are under the same pressure as the interior of the packing space 20, movement of the bellows will reflect any changes of pressure in the packing space 20. When the vacuum is sufficient, the ball will be freely movable.

With a leak in package 2, the vacuum drops and bellows 3 expands axially while space 10 diminishes. As soon as the clearance of the intermediate space 10 is reduced to a spacing corresponding to the diameter of ball 11, the ball will be held between the wall 7 and cover 9 and will be fixed in position. In this way, any untight condition of the package 2 is immediately detected before the interior pressure rises to the normal pressure. Consequently, the leak can be remedied prior to any damage to the protective breathing apparatus.

The apparatus makes it possible for the condition to be detected by changes of sound due to the movement or absence of movement of the ball, as well as by a visual check which can be made by viewing through a viewing window into the chamber 1. This viewing may be accomplished by making the cover wall 9 transparent so that it can be readily determined whether the ball 11 is free or held in a fixed position.

While a specific embodiment of the invention has been shown and described in detail to illustrate the application of the principles of the invention, it will be understood that the invention may be embodied otherwise without departing from such principles.

What is claimed is:

1. A device for indicating the airtightness of a container for apparatus which is to be stored under vacuum and, particularly for protective breathing apparatus, comprising, a container wall of the device defining a packing space in which the apparatus is stored and having an outer surface with a recessed portion forming a chamber, a cover for said chamber overlying the recessed portion and closing the chamber, a hollow expansible and retractable member mounted in said chamber and having an opening which extends through said recessed portion and into the interior of the packing space so that the pressure inside said hollow expansible and retractable member is the same as that inside the packing space, and a ball disposed between said hollow expansible and retractible member and said cover and being freely movable when said hollow expansible and retractable member is retracted with relatively low pressure therein and in said packing space and held motionless between said expansible and retractible member and said cover by expansion of said expansible and retractable member with a relatively increased pressure in said member and said packing space due to a failure of the airtightness of the container.

2. A device for indicating the airtightness of a container, as claimed in claim 1, wherein said cover is transparent permitting the viewing of the interior of the chamber and the ball therethrough.

3. A device for indicating the airtightness of a container, as claimed in claim 1, wherein said expansible and retractable member comprises a bellows.

4. A device for indicating the airtightness of a container, as claimed in claim 1, wherein said expansible and retractable member comprises a bellows having a bolt connected to one side thereof and extending through said container and being threaded, a nut threaded over said bolt holding said bellows and said bolt in position, said bellows having a substantially flat top wall spaced from said cover, said ball being confined in the space between said flat top of said bellows and said cover.

* * * * *